US012340727B1

(12) United States Patent
Kim et al.

(10) Patent No.: US 12,340,727 B1
(45) Date of Patent: Jun. 24, 2025

(54) DISPLAY DRIVING DEVICE AND METHOD

(71) Applicant: Magnachip Mixed-Signal, Ltd., Cheongju-si (KR)

(72) Inventors: Hyoungkyu Kim, Cheongju-si (KR); Iljun Kim, Cheongju-si (KR); Okyeon Park, Cheongju-si (KR)

(73) Assignee: Magnachip Mixed-Signal, Ltd., Cheongju-si (KR)

( * ) Notice: Subject to any disclaimer, the term of this patent is extended or adjusted under 35 U.S.C. 154(b) by 0 days.

(21) Appl. No.: 18/779,249

(22) Filed: Jul. 22, 2024

(30) Foreign Application Priority Data

Dec. 20, 2023 (KR) ........................ 10-2023-0187037

(51) Int. Cl.
*G09G 3/20* (2006.01)

(52) U.S. Cl.
CPC ... *G09G 3/2092* (2013.01); *G09G 2310/0275* (2013.01); *G09G 2310/08* (2013.01); *G09G 2330/023* (2013.01)

(58) Field of Classification Search
None
See application file for complete search history.

(56) References Cited

U.S. PATENT DOCUMENTS 11,443,696 B2 * 9/2022 Lin ...................... G09G 3/3275
2006/0033483 A1 2/2006 Wu
2011/0012671 A1 * 1/2011 Chuang ................... H02M 3/07 327/536
2012/0218032 A1 * 8/2012 Nadimpalli ........... H02M 3/073 327/536
2019/0371271 A1 * 12/2019 Morris .................. G06F 3/1446
2022/0139349 A1 * 5/2022 Park ..................... G09G 3/3688 345/87

* cited by examiner

*Primary Examiner* — Christopher J Kohlman
(74) *Attorney, Agent, or Firm* — NSIP Law

(57) ABSTRACT

A display driving device includes a timing controller and a charge pump configured to output a pump voltage for driving a source driver. The charge pump includes a flying capacitor; a first switch disposed between one end of the flying capacitor and a first terminal; a second switch disposed between the one end of the flying capacitor and a second terminal; a third switch disposed between another end of the flying capacitor and a third terminal; a fourth switch disposed between the another end of the flying capacitor and a fourth terminal; and a charge pump control unit configured to control turning on or off of the first to the fourth switches based on the anti-tearing signal, and control the first to the fourth switches based on the anti-tearing signal to operate in a first mode or a second mode configured to reduce power consumption than in the first mode.

20 Claims, 9 Drawing Sheets

DISPLAY DRIVING DEVICE AND METHOD

CROSS-REFERENCE TO RELATED APPLICATIONS

The application claims the benefit under 35 USC 119 (a) of Korea Patent Application No. 10-2023-0187037, filed Dec. 20, 2023, in the Korean Intellectual Property Office, the entire disclosure of which is incorporated herein by reference for all purposes.

BACKGROUND

1. Field

The following description relates to a display driving device and method.

2. Description of the Background

In the field of display systems (OLED, LCD, . . . ), technologies varying refresh rates by adjusting porch periods have been used. Refresh rates may be changed by changing the frequency of a vertical synchronization signal (vertical sync, Vsync), and a porch period may be prolonged gradually as the frequency of the vertical synchronization signal is changed from 120 Hz, 60 Hz, 30 Hz, . . . , to 1 Hz.

While providing data from the source driver to a panel, a driving voltage capable of driving a source driver may be desired to have a higher voltage than a power supply voltage supplied by a battery inside the display device. Therefore, the source driver may include a charge pump circuit capable of outputting and providing a pump voltage corresponding to the driving voltage by pumping the power supply voltage supplied by the battery.

Because the source driver does not require a high pump voltage since the source driver does not provide data to the panel at the porch period, unlike an active period of the display device, the charge pump circuit, at the porch period, need not output the same pump voltage as the pump voltage of the active period. If the porch period is short, there is no difference in the power consumption of the display device even if the same pump voltage as the pump voltage of the active period is output; however, if the porch period is elongated as a frequency of the vertical synchronization signal is reduced, there occurs a problem of wasting the power of the display device when the same pump voltage as the pump voltage of the active period is output.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a display driving device includes a timing controller configured to generate a pumping clock signal and an anti-tearing signal identifying an active period and a porch period based on a vertical synchronization signal; and a charge pump configured to output a pump voltage for driving a source driver. The charge pump includes a flying capacitor; a first switch disposed between one end of the flying capacitor and a first terminal connected to a first external voltage; a second switch disposed between the one end of the flying capacitor and a second terminal outputting a first output voltage; a third switch disposed between another end of the flying capacitor and a third terminal connected to a second external voltage; a fourth switch disposed between the another end of the flying capacitor and a fourth terminal outputting a second output voltage; and a charge pump control unit configured to control turning on or off of the first to the fourth switches based on the anti-tearing signal, and control the first to the fourth switches based on the anti-tearing signal to operate in a first mode or a second mode. The second mode is configured to reduce power consumption than in the first mode.

In the active period, the timing controller may provide image data to the source driver. In the porch period, the timing controller may not provide image data to the source driver.

The timing controller generates a deactivation signal level of the anti-tearing signal during the active period, and generates a activation signal level of the anti-tearing signal during the porch period.

The charge pump control unit may be configured to operate in the first mode at the active period, and operate in the second mode at the porch period based on the anti-tearing signal.

In the second mode, the charge pump control unit may be configured to control a frequency of a pumping clock signal configured to turn on or off the first to the fourth switches.

The display driving device may further include a pump voltage comparison unit configured to compare the pump voltage and a predetermined detection voltage, and output a comparison voltage at a high level when a magnitude of the pump voltage is smaller than a magnitude of the detection voltage. The charge pump control unit may be configured to control the first to the fourth switches to operate based on the comparison voltage in the first mode or the second mode.

The charge pump control unit may be configured to control a frequency of the pumping clock signal configured to turn on or off the first to the fourth switches in the second mode at a period at which the comparison voltage at the high level is output.

In another general aspect, a display driving device includes a timing controller configured to generate a pumping clock signal and an anti-tearing signal identifying an active period and a porch period based on a vertical synchronization signal; and a charge pump configured to output a pump voltage for driving a source driver. The charge pump includes a flying capacitor; a first switch stage comprising at least one switch disposed between one end of the flying capacitor and a first terminal connected to a first external voltage and connected in parallel thereto; a second switch stage comprising at least one switch disposed between the one end of the flying capacitor and a second terminal outputting a first output voltage and connected in parallel thereto; a third switch stage comprising at least one switch disposed between another end of the flying capacitor and a third terminal connected to a second external voltage and connected in parallel thereto; a fourth switch stage comprising at least one switch disposed between the another end of the flying capacitor and a fourth terminal outputting a second output voltage and connected in parallel thereto; and a charge pump control unit configured to control turning on or off of the first to the fourth switch stages based on the anti-tearing signal to operate in a first mode or a second mode. The second mode is configured to reduce power consumption than in the first mode.

In the active period, the timing controller may provide image data to the source driver, and in the porch period, the timing controller may not provide image data to the source driver.

The timing controller generates a deactivation signal level of the anti-tearing signal during the active period, and generates a activation signal level of the anti-tearing signal during the porch period.

The charge pump control unit may be configured to operate in the first mode at the active period, and operate in the second mode at the porch period based on the anti-tearing signal.

In the second mode, the charge pump control unit may be configured to control only some switches among the switches of the first to the fourth switch stages to be turned on or off, and control remaining switches thereof not to operate in a turn-off state.

The display driving device may further include a pump voltage comparison unit configured to compare the pump voltage and a predetermined detection voltage, and output a comparison voltage at a high level when a magnitude of the pump voltage is smaller than a magnitude of the detection voltage. The charge pump control unit may be configured to control the first to the fourth switch stages to operate based on the comparison voltage in the first mode or the second mode configured to reduce power consumption more than in the first mode.

The charge pump control unit may be configured to control only some switches among the switches of the first to the fourth switch stages to be turned on or off, and to control remaining switches thereof not to operate in a turn-off state, by operating in the second mode, at a period at which the comparison voltage at the high level is output.

In another general aspect, a method for operating a display driving device includes a first switch stage, a second switch stage, a third switch stage, and a fourth switch stage, respectively comprising at least one or more switches connected in parallel thereto so as to output a pump voltage. The method includes generating an anti-tearing signal identifying an active period and a porch period based on a vertical synchronization signal; generating a first control signal controlling the first switch stage, a second control signal controlling the second switch stage, a third control signal controlling the third switch stage, and a fourth control signal controlling the fourth switch stage based on the anti-tearing signal; and controlling an operation of a charge pump based on the first control signal, the second control signal, the third control signal, and the fourth control signal. The controlling of the operation of the charge pump includes generating a control signal of a first mode or a second mode, and the second mode is configured to reduce power consumption than in the first mode based on the anti-tearing signal.

The generating of the control signal of the second mode may include generating a control signal having a lower frequency than a frequency of a control signal of the first mode.

The generating of the control signal of the second mode may include outputting a comparison voltage at a high level when the pump voltage is smaller than a predetermined detection voltage; and generating a control signal having a lower frequency than a frequency of a control signal of the first mode based on the comparison voltage at a high level.

The generating of the control signal of the second mode may include generating a control signal configured to control only some switches among the switches of the first to the fourth switch stages to be turned on or off, and control remaining switches thereof not to operate in a turn-off state.

The generating of the control signal of the second mode may include outputting a comparison voltage at a high level when a magnitude of the pump voltage is smaller than a magnitude of a predetermined detection voltage; and generating a control signal configured to control only some switches among the switches of the first to the fourth switch stages to be turned on or off, and to control remaining switches thereof not to operate in a turn-off state based on the comparison voltage at a high level.

The generating of the control signal of the second mode may include generating a control signal having a frequency same as a frequency of the control signal of the first mode.

Other features and aspects will be apparent from the following detailed description, the drawings, and the claims.

Figure 1:
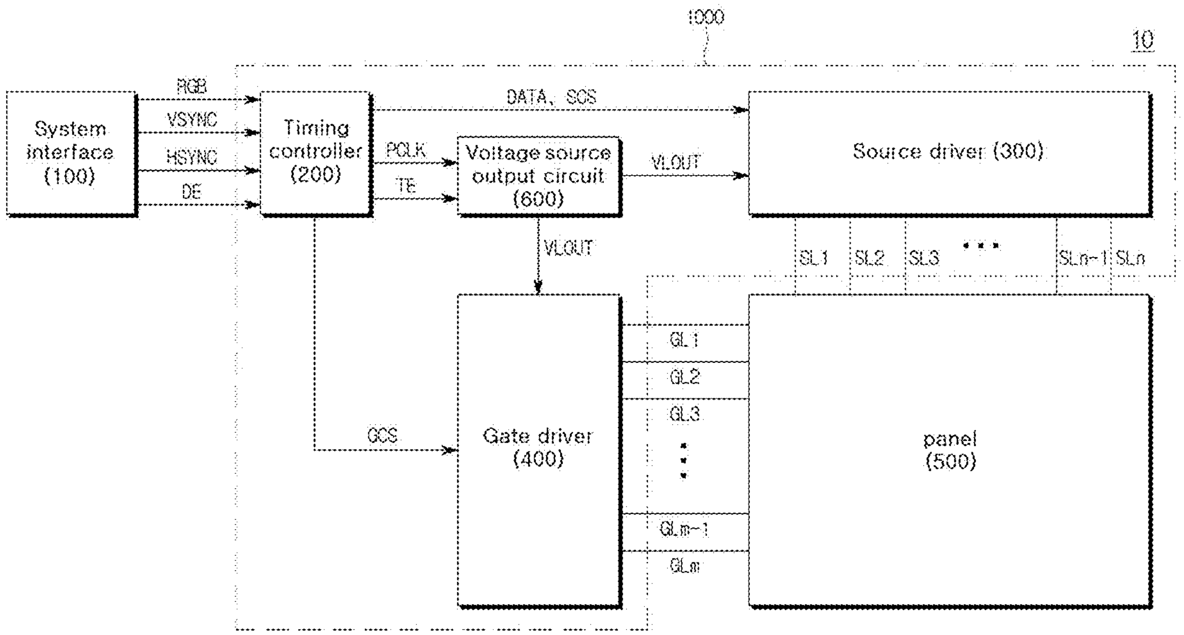
FIG. 1 is a block diagram illustrating a display device according to an embodiment of the present disclosure.

Throughout the drawings and the detailed description, unless otherwise described, the same reference numerals refer to the same elements. The drawings may not be to scale, and the relative size, proportions, and depiction of elements in the drawings may be exaggerated for clarity, illustration, and convenience.

DETAILED DESCRIPTION

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

A term "part" or "module" used in the embodiments may mean software components or hardware components such as a field programmable gate array (FPGA), an application specific integrated circuit (ASIC). The "part" or "module" performs certain functions. However, the "part" or "module" is not meant to be limited to software or hardware. The "part" or "module" may be configured to be placed in an addressable storage medium or to restore one or more processors. Thus, for one example, the "part" or "module" may include components such as software components, object-oriented software components, class components, and task components, and may include processes, functions, attributes, procedures, subroutines, segments of a program code, drivers, firmware, microcode, circuits, data, databases, data structures, tables, arrays, and variables. Components and functions provided in the "part" or "module" may be combined with a smaller number of components and "parts" or "modules" or may be further divided into additional components and "parts" or "modules."

FIG. 1 is a block diagram illustrating a display device according to an embodiment of the present disclosure.

Referring to FIG. 1, a display device 10 may be a device capable of displaying an image or video. The display device 10 may include a system interface 100, a panel 500, and a display driving device 1000.

According to an embodiment, the display driving device 1000 may include a timing controller 200, a source driver 300, a gate driver 400, and a voltage source output circuit 600.

According to an embodiment, the gate driver 400 may not be included in the display driving device 1000. If the gate driver 400 is not included in the display driving device 1000, the gate driver 400 may act as a panel driver configured to drive a sub-pixel provided in the panel 500.

According to an embodiment, the system interface 100 may receive an image signal from the outside. The system interface 100 may provide a plurality of control signals such as an image signal RGB, a vertical synchronization signal VSYNC, a horizontal synchronization signal HSYNC, and a data enable signal DE to the timing controller 200.

According to an embodiment, the timing controller 200 may receive an image signal RGB from the system interface 100, and generate image data DATA by processing or converting the image signal RGB to be fitted in a structure of the panel 500.

According to an embodiment, the timing controller 200 may receive the vertical synchronization signal VSYNC, the horizontal synchronization signal HSYNC, and the data enable signal DE from the system interface 100, and may provide the image data DATA to the source driver based on the received signals. The timing controller 200 may provide the image data DATA in a unit of a pixel to the source driver 300.

According to an embodiment, the timing controller 200 may generate the image data DATA in which a clock signal is embedded and provide the image data DATA in which a clock signal is embedded to the source driver 300.

According to an embodiment, based on a plurality of control signals received from the system interface 100, the timing controller 200 may generate a source driver control signal SCS for controlling the source driver 300, and a gate driver control signal GCS for controlling the gate driver 400. The timing controller 200 may control various operation timings of the source driver 300 and the gate driver 400 based on the source driver control signal SCS and the gate driver control signal GCS.

According to an embodiment, the timing controller 200 may provide the image data DATA to the source driver 300 regardless of the frequency of the vertical synchronization signal VSYNC in accordance with a pumping clock signal PCLK. At this time, the pumping clock signal PCLK must have a frequency that is sufficient to transmit all the image data DATA of one frame at once, even when the length of the frame is the shortest, that is, the frequency of the vertical synchronization signal VSYNC is the highest. Even if the frequency of the vertical synchronization signal VSYNC is changed, or the length of the frame is changed, the timing controller 200 may provide the image data DATA to the source driver 300 in accordance with the pumping clock signal PCLK by keeping the image data DATA constant.

According to an embodiment, the timing controller 200 may generate an anti-tearing signal TE, which identifies an active period and a porch period based on the vertical synchronization signal VSYNC and the pumping clock signal PLCK.

According to an embodiment, the timing controller 200 may generate the anti-tearing signal TE for identifying the active period at which the image data DATA is provided to the source driver 300 and the porch period at which the image data DATA is not provided to the source driver 300 of the display device 10. Here, the anti-tearing signal TE is a control signal for preventing tearing or a screen tearing effect that occurs due to a difference in the transmission rates between a transmission rate at which the timing controller 200 provides the image data DATA to the source driver 300, and a transmission rate at which the source driver 300 provides the image data DATA to the pixel existing in the panel 500. The anti-tearing signal TE may be any one signal among a plurality of control signals included in the source driver control signals SCS.

According to an embodiment, it is possible to set a time period between the vertical synchronization signals VSYNC as a frame, and the length of the frame may be changed according to the frequency of the vertical synchronization signal VSYNC. The frames may be divided into the active period and the porch period. The active period may be defined as a period at which the timing controller 200 provides the image data DATA to the source driver 300, and the porch period may be defined as a pause period at which the timing controller 200 does not provide the image data DATA to the source driver 300. The image data DATA desired in the display device 10 to display one frame may be provided at the active period. According to an embodiment, the porch period may be present within one frame, ahead of the active period, and at the rear of the active period, depending on the structure of the display device 10.

According to an embodiment, the timing controller 200 may generate the anti-tearing signal TE such that the active period remains constant and the porch period decreases or increases when the vertical synchronization signal VSYNC frequency increases or decreases.

According to an embodiment, the timing controller 200 may generate the anti-tearing signal TE in response to the porch period, which increases as the vertical synchronization signal VSYNC frequency decreases.

According to an embodiment, the active period may represent a period of time taken by the timing controller 200 in providing the image data DATA in accordance with the pumping clock signal PCLK, regardless of the frequency change of the vertical synchronization signal VSYNC. Therefore, the length of the active period may be constant, regardless of the frequency (the length of the frame) of the vertical synchronization signal VSYNC. Even if the frequency of the vertical synchronization signal VSYNC becomes lower than the maximum frequency and the length of the frame elongates, the timing controller 200 may provide the image data DATA by maintaining the active period to be constant, and may stop the transmission of the image data DATA by setting the porch period until the next vertical synchronization signal VSYNC is provided.

According to an embodiment, the timing controller 200 may generate the anti-tearing signal TE at a deactivation signal level (low level) at the active period at which the image data DATA is provided to the source driver 300.

According to an embodiment, the timing controller 200 may generate the anti-tearing signal TE at an activation signal level (high level) at the porch period at which the image data DATA is not provided to the source driver 300.

According to an embodiment, the timing controller 200 may provide the anti-tearing signal TE to the voltage source output circuit 600, and the voltage source output circuit 600 may control an operation of a charge pump 620 based on the anti-tearing signal TE. As described below, a charge pump control unit 610 included in the voltage source output circuit 600 may identify the active period and the porch period based on the anti-tearing signal TE, and may control a switching operation of the charge pump 620.

According to an embodiment, the source driver 300 may, in response to the source driver control signal SCS, receive the image data DATA in a unit of a pixel, latch the image datas per line, and provide the latched image datas to the panel 500.

According to an embodiment, the source driver 300 may, in response to the source driver control signal SCS, convert digital signals of the image data DATA into analog signals and provide the converted image datas to a plurality of source lines (SL1 to SLn).

According to an embodiment, the gate driver 400 may sequentially provide a gate-on signal to a plurality of gate lines (GL1 to GLm) in response to the gate driver control signal GCS.

According to an embodiment, the panel 500 may include a plurality of gate lines (GL1 to GLm), which are arranged in rows, a plurality of source lines (SL1 to SLn), which are arranged in columns, and sub-pixels formed at intersections of the plurality of gate lines (GL1 to GLm) and the plurality of source lines (SL1 to SLn). Based on the vertical synchronization signal VSYNC and the horizontal synchronization signal HSYNC, the image data latched per line by the source driver 300 may be sequentially provided to the panel 500, and the sub-pixels may be driven.

Figure 2:
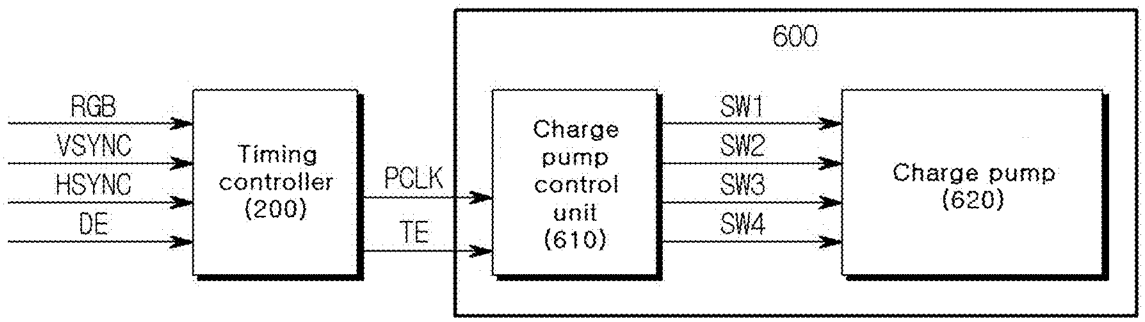
FIG. 2 is a block diagram illustrating a relevant portion of a charge pump of a display device according to an embodiment of the present disclosure.

FIG. 2 is a block diagram illustrating a relevant portion of the charge pump of the display device according to an embodiment of the present disclosure.

Referring to FIG. 2, according to an embodiment, when a magnitude of a voltage desired for driving various components inside the source driver 300 and the gate driver 400 or that desired for driving the panel 500 is desired to be higher than a magnitude of the power supply voltage VLIN, the voltage source output circuit 600 may pump the power supply voltage VLIN and output a pump voltage VLOUT.

According to an embodiment, the voltage source output circuit 600 may include the charge pump 620 configured to output the pump voltage VLOUT desired for driving the source driver 300 and the gate driver 400, and the charge pump control unit 610 configured to control an operation of the charge pump 620.

According to an embodiment, the charge pump control unit 610 may receive the pumping clock signal PCLK from the timing controller 200. The pumping clock signal PCLK provided to the charge pump control unit 610 may be provided to the charge pump 620 to be used as a control signal.

According to an embodiment, the charge pump control unit 610 may receive the anti-tearing signal TE from the timing controller 200. The charge pump control unit 610 may generate at least one or more control signals (SW1 to SW4) based on the anti-tearing signal TE. The charge pump control unit 610 may control an operation of the charge pump 620 based on the at least one or more control signals (SW1 to SW4).

According to an embodiment, the charge pump control unit 610 may control the charge pump 620 to operate in a first mode, or in a second mode configured to reduce power consumption than in the first mode based on the anti-tearing signal TE.

According to an embodiment, the charge pump control unit 610 may control a switching operation of the charge pump 620 in the first mode at the active period, and a switching operation of the charge pump 620 in the second mode at the porch period, based on the anti-tearing signal TE. In addition, as described below, the charge pump control unit 610 may control the switching operation of the charge pump 620 in the first mode at a period at which a comparison voltage at a low level is output, and may control the switching operation of the charge pump 620 in the second mode at a period at which a comparison voltage at a high level is output, based on the comparison voltages output from the pump voltage comparison unit 630.

According to an embodiment, based on the anti-tearing signal TE, the charge pump control unit 610 may identify the active period and the porch period, and control the charge pump 620, at the porch period, to perform a switching operation that reduces the power consumption more than the power consumption at the active period.

According to an embodiment, the charge pump control unit 610 may generate the first to fourth control signals (SW1 to SW4), which are configured to control the switching operation of the first to the fourth switches of the charge pump 620 to slow down in the second mode at the porch period based on the anti-tearing signal TE.

According to an embodiment, the charge pump control unit 610 may control only some switches of at least one or more switches connected in parallel and forming each of the first to the fourth switch stages of the charge pump 620, to be turned on or off in the second mode at the porch period based on the anti-tearing signal TE. The charge pump control unit 610 may control the remaining switches thereof not to operate in a turn-off state.

According to an embodiment, the charge pump 620 may perform the switching operation based on the first to the fourth control signals (SW1 to SW4), and may pump the input power supply voltage VLIN and output it as the pump voltage VLOUT.

A detailed structure of the charge pump 620 will be described below with reference to FIGS. 3A to 3C.

Figure 3A:
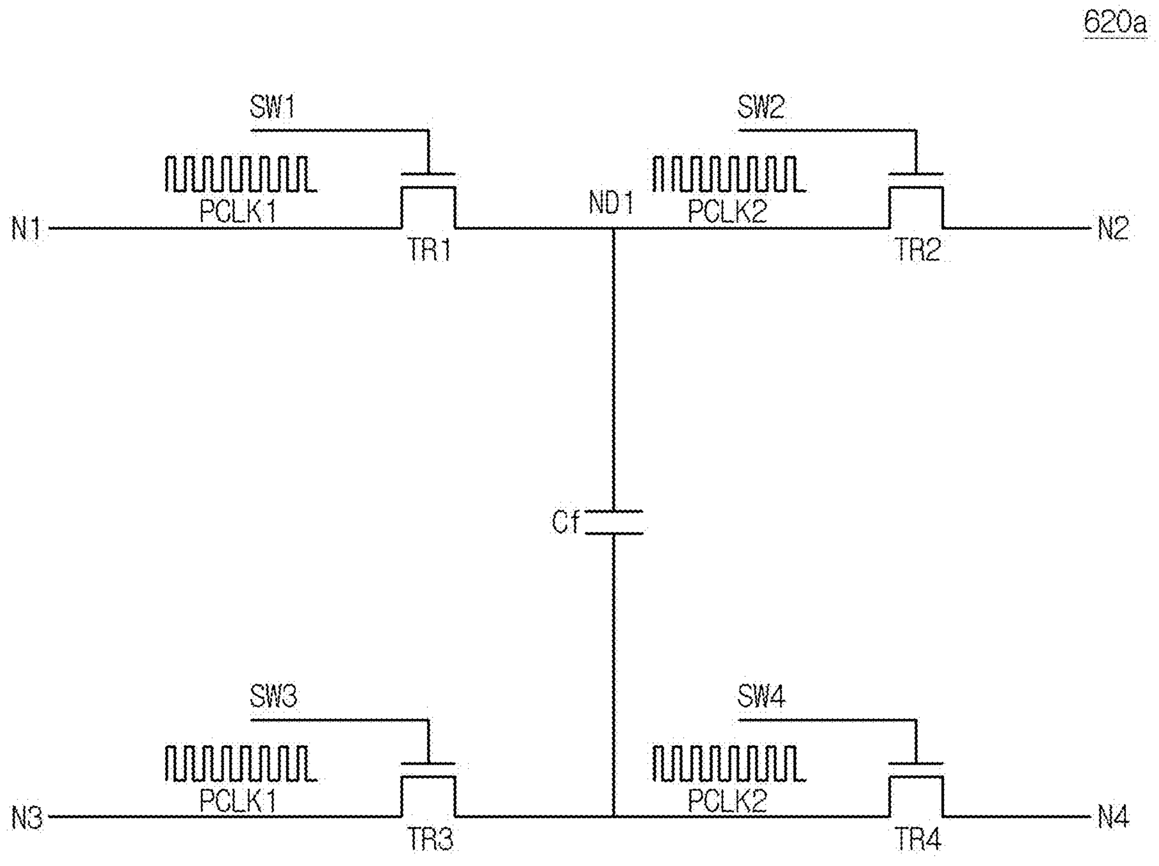
FIG. 3A is a diagram illustrating a circuit of a charge pump according to a related art.
Figure 3B:
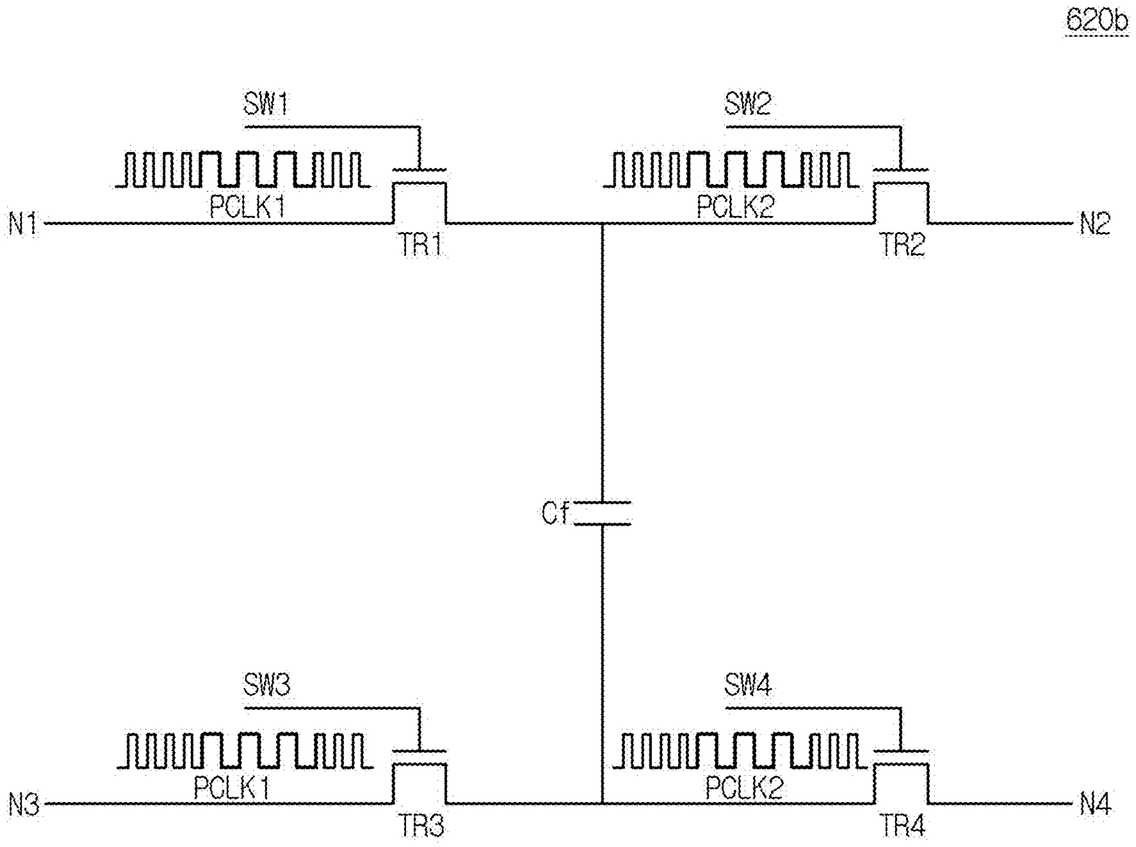
FIG. 3B is a diagram illustrating a circuit of a charge pump according to an embodiment of the present disclosure.
Figure 3C:
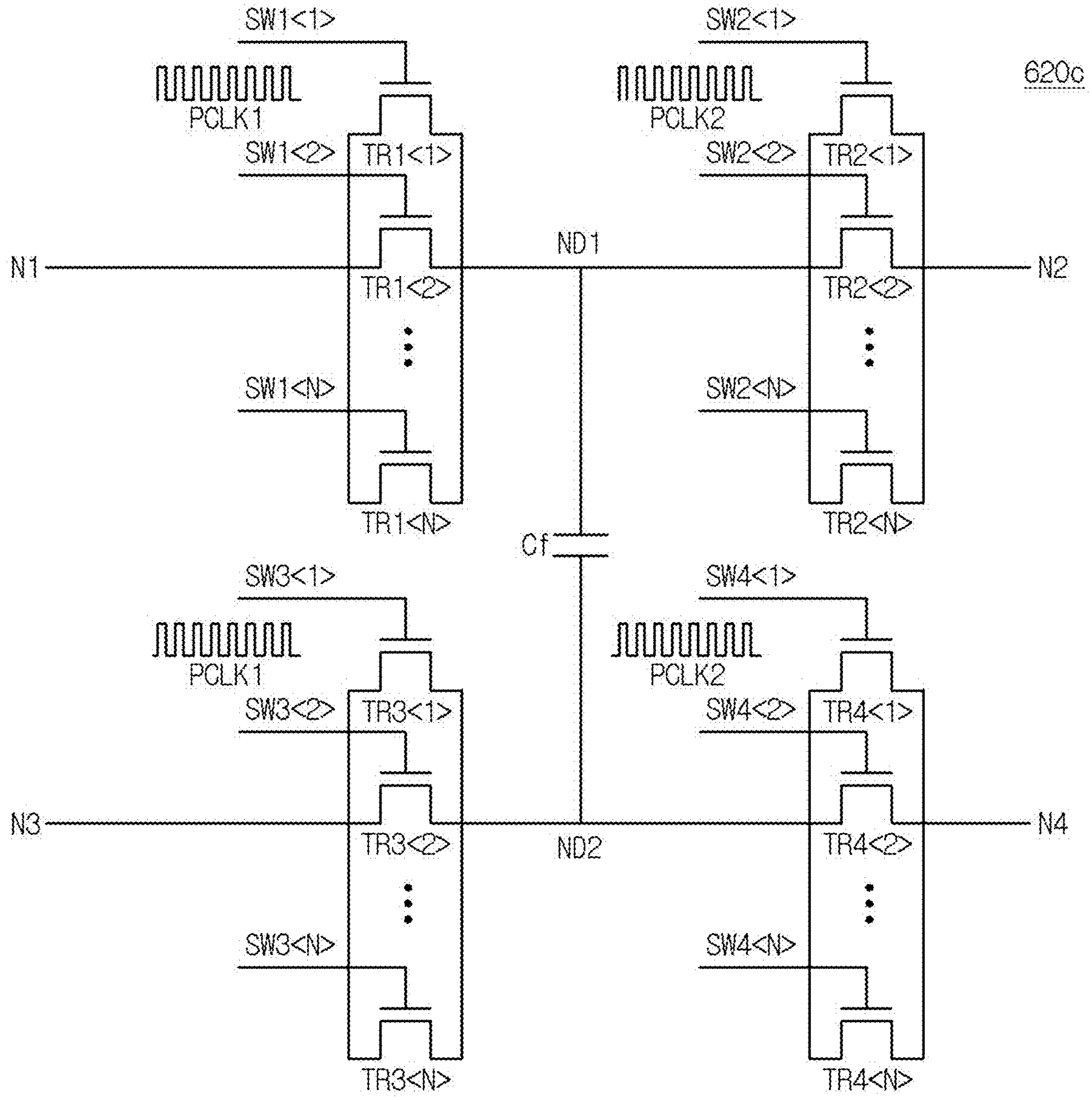
FIG. 3C is a diagram illustrating a circuit of a charge pump according to an embodiment of the present disclosure.

The switches or the switch stages of FIGS. 3A to 3C may be configured as a metal oxide semiconductor field effect transistor (MOSFET); however, the present disclosure is not limited thereto. In addition, the switches or switch stages configured as the MOSFET may be turned on or off by receiving the first to the fourth control signals through the gate terminals.

FIG. 3A is a diagram illustrating a circuit of a charge pump according to a related art.

Referring to FIG. 3A, the charge pump 620*a* according to the related art may be configured with a flying capacitor Cf, a first switch TR1 provided between one end of the flying capacitor Cf and a first terminal N1 connected to a first external voltage, a second switch TR2 provided between the one end of the flying capacitor Cf and a second terminal N2 outputting a first output voltage, a third switch TR3 provided between the other end of the flying capacitor Cf and a third terminal N3 connected to a second external voltage, and a fourth switch TR4 provided between the other end of the flying capacitor Cf and a fourth terminal N4 outputting a second output voltage. The first to the fourth switches (TR1 to TR4) may be turned off or on by the first to the fourth control signals (SW1 to SW4).

The first and the third control signals (SW1 and SW3) may be the first pumping clock signals PCLK1, and the second and the fourth control signals (SW2 and SW4) may be the second pumping clock signals PCLK2.

The charge pump 620*a*, according to the related art, performs the switching operation by the first and the second pumping clock signals (PCKL1 and PCLK2) having a constant frequency regardless of the distinction of the active period and the porch period; therefore, many problems occur with respect to high power consumption because of the static current, even at the porch period.

FIG. 3B is a diagram illustrating a circuit of the charge pump according to an embodiment of the present disclosure.

Referring to FIG. 3B, the charge pump 620*b*, according to the present disclosure, may be configured with a flying capacitor Cf, a first switch TR1 provided between one end of the flying capacitor Cf and a first terminal N1 connected to a first external voltage, a second switch TR2 provided between the one end of the flying capacitor Cf and a second terminal N2 outputting a first output voltage, a third switch TR3 provided between the other end of the flying capacitor Cf and a third terminal N3 connected to a second external voltage, and a fourth switch TR4 provided between the other end of the flying capacitor Cf and a fourth terminal N4 outputting a second output voltage.

The charge pump 620*b*, according to an embodiment of the present disclosure, may be configured with one charge pump 620*b*, or may be configured with a plurality of charge pumps 620*b*, and may be disposed in a cascade structure configured to input an output voltage of any one charge pump 620*b* as a power supply voltage of the other charge pump 620*b*.

For example, the first external voltage may be the power supply voltage, the second external voltage may be a ground voltage, and the second output voltage may be a pump voltage if the second output voltage is configured with one charge pump 620*b*, or may be the power supply voltage of any other charge pump 620*b* if the second output voltage is configured with a plurality of charge pumps 620*b* in the cascade structure, but are not limited thereto.

The first to the fourth switches (TR1 to TR4) may be turned on or off by the first to the fourth control signals (SW1 to SW4). The first and the third control signals (SW1 and SW3) may be the first pumping clock signals PCLK1, and the second and the fourth control signals (SW2 and SW4) may be the second pumping clock signals PCLK2.

According to an embodiment, the first and the second pumping clock signals (PCLK1 and PCLK2) may be inverted relative to each other. If the first and the second pumping clock signals (PCLK1 and PCLK2) are inverted relative to each other, all the first to the fourth switches (TR1 to TR4) may be n-type MOSFETs or p-type MOSFETs.

According to an embodiment, the first and the second pumping clock signals (PCLK1 and PCLK2) may be the same signals. In case of the first and the second pumping clock signals (PCLK1 and PCLK2) are the same signals, if the first and the third switches (TR1 and TR3) are the n-type MOSFETs, the second and the fourth switches (TR2 and TR4) may be the p-type MOSFETs. Alternatively, if the first and the third switches (TR1 and TR3) are the p-type MOSFETs, the second and the fourth switches (TR2 and TR4) may be the n-type MOSFETs.

According to an embodiment, in a pre-charge period, the first and the third switches (TR1 and TR3) perform a turn-on operation by the first and the third control signals (SW1 and SW3) to be closed, the second and the fourth switches (TR2 and TR4) perform a turn-off operation by the second and the fourth control signals (SW2 and SW4) to be opened, and electric charges corresponding to the power supply voltage VLIN may be pre-charged in the flying capacitor Cf.

According to an embodiment, in a pumping period, the first and the third switches (TR1 and TR3) perform a turn-off operation by the first and the third control signals (SW1 and SW3) to be opened, the second and the fourth switches (TR2 and TR4) perform a turn-on operation by the second and the fourth control signals (SW2 and SW4) to be closed, the electric charges that have been pre-charged in the flying capacitor Cf are discharged and combined with the second output voltage and the pump voltage VLOUT may be output through an output terminal. Here, the second output voltage may be the power supply voltage VLIN, or the pump voltage VLOUT output from another charge pump 620*b*.

According to the anti-tearing signal TE, the charge pump 620*b*, according to the present disclosure, may perform the switching operation by the first and the second pumping clock signals (PCLK1 and PCLK2) having a constant frequency at the active period, and may perform the switching operation by the first and the second pumping clock signals (PCLK1 and PCLK2), of which the frequency has been modulated, at the porch period. Therefore, according to the present disclosure, the charge pump 620*b* may reduce power consumption caused by the static current at the porch period.

FIG. 3C is a diagram illustrating a circuit of the charge pump according to an embodiment of the present disclosure.

Referring to FIG. 3C, the charge pump 620*c* according to an embodiment may include the flying capacitor Cf, the first to the fourth terminals (N1 to N4), the first to the fourth switch stages (TR1<1>~ TR1<N> to TR4<1>~ TR4<N>) in which at least one or more switches are connected in parallel thereto, respectively, and the switches of the first to the fourth switch stages (TR1<1>~ TR1<N> to TR4<1>~ TR4<N>) may perform a turn-on or a turn-off operation based on the first to the fourth control signals (SW1<1>~ SW1<N> to SW4<1>~ SW4<N>) and may output the pump voltage.

In more detail, according to an embodiment, the first switch stage (TR1<1> to TR1<N>) may be provided between one end of the flying capacitor Cf and the first terminal N1 connected to the first external voltage, and may include at least one switch connected in parallel thereto.

The second switch stage (TR2<1> to TR2<N>) may be provided between the one end of the flying capacitor Cf, and the second terminal N2 outputting the first output voltage, and may include at least one switch connected in parallel thereto.

The third switch stage (TR3<1> to TR3<N>) may be provided between the other end of the flying capacitor Cf and the third terminal N3 connected to the second external voltage, and may include at least one switch connected in parallel thereto.

The fourth switch stage (TR4<1> to TR4<N>) may be provided between the other end of the flying capacitor Cf and the fourth terminal N4 outputting the second output voltage, and may include at least one switch connected in parallel thereto.

According to an embodiment, the first and the third control signals (SW1<1> to SW1<N> and SW3<1> to SW3<N>), configured to control the turn-on or turn-off operation of the first and the third switch stages (TR1<1> to TR1<N> and TR3<1> to TR3<N>), may be the first pumping clock signals (PCLK1). The second and the fourth control signals (SW2<1> to SW2<N> and SW4<1> to SW4<N>), configured to control the turn-on or turn-off operation of the second and the fourth switch stages (TR2<1> to TR2<N> and TR4<1> to TR4<N>), may be the second pumping clock signals (PCLK2).

The first and the second pumping clock signals (PCLK1 and PCLK2) may be inverted relative to each other. If the first and the second pumping clock signals (PCLK1 and PCLK2) are inverted relative to each other, all the first to the fourth switch stages (TR1<1>~ TR1<N> to TR4<1>~ TR4<N>) may be the n-type MOSFETs or the p-type MOSFETs.

The first and the second pumping clock signals (PCLK1 and PCLK2) may be the same signals. In case of the first and the second pumping clock signals (PCLK1 and PCLK2) are the same signals, if the first and the third switch stages (TR1<1>~ TR1<N> and TR3<1>~ TR3<N>) are the n-type MOSFETs, the second and the fourth switch stages (TR2<1>~ TR2<N> and TR4<1>~ TR4<N>) may be the p-type MOSFETs. Alternatively, if the first and the third switch stages (TR1<1>~ TR1<N> and TR3<1>~ TR3<N>) are the p-type MOSFETs, the second and the fourth switch stages (TR2<1>~ TR2<N> and TR4<1>~ TR4<N>) may be the n-type MOSFETs.

According to an embodiment, in the pre-charge period, the first and the third switches (TR1<1>~ TR1<N> and TR3<1>~ TR3<N>) perform a turn-on operation by the first and the third control signals (SW1<1>~ SW1<N> and SW3<1>~ SW3<N>) to be closed, the second and the fourth switch stages (TR2<1>~ TR2<N> and TR4<1>~ TR4<N>) perform a turn-off operation by the second and the fourth control signals (SW2<1>~ SW2<N> and SW4<1>~ SW4<N>) to be opened, and electric charges corresponding to the power supply voltage VLIN may be pre-charged in the flying capacitor Cf.

According to an embodiment, in a pumping period, the first and the third switch stages (TR1<1>~ TR1<N> and TR3<1>~ TR3<N>) perform a turn-off operation by the first and the third control signals (SW1<1>~ SW1<N> and SW3<1>~ SW3<N>) to be opened, the second and the fourth switch stages (TR2<1>~ TR2<N> and TR4<1>~ TR4<N>) perform a turn-on operation by the second and the fourth control signals (SW2<1>~ SW2<N> and SW4<1>~ SW4<N>) to be closed, the electric charges that have been pre-charged in the flying capacitor Cf are discharged and combined with the second output voltage and the pump voltage VLOUT may be output through the output terminal. Here, the second output voltage may be the power supply voltage VLIN, or the pump voltage VLOUT output from another charge pump 620*c*.

According to an embodiment, the charge pump control unit 610 may control the switches of the first to the fourth switch stages to operate in the first mode or the second mode configured to reduce the power consumption more than in the first mode. The first mode may be a mode in which the charge pump 620*c* operates at the active period, and the second mode may be a mode in which the charge pump 620*c* operates at the porch period.

According to an embodiment, based on the anti-tearing signal TE, the charge pump control unit 610 may generate the first to the fourth control signals (SW1<1> to SW1<N>, SW2<1> to SW2<N>, SW3<1> to SW3<N>, and SW4<1> to SW4<N>) such that only some switches among the plurality of switches (TR1<1> to TR1<N>, TR2<1> to TR2<N>, TR3<1> to TR3<N>, and TR4<1> to TR4<N>) connected in parallel to the first to the fourth switch stages, respectively, perform the turn-on or turn-off operation at the porch period. The charge pump control unit 610 may control only some switches of the charge pump 620*c* to perform a turn-on or turn-off operation based on the first to the fourth control signals, and the remaining switches thereof not to operate in a turn-off state at the porch period.

According to an embodiment, the charge pump control unit 610 may control the minimum switches desired for operation among the switches of the first to the fourth switch stages (TR1<1>~ TR1<N>, TR2<1>~ TR2<N>, TR3<1>~ TR3<N>, and TR4<1>~ TR4<N>) to operate at the porch period so that the pump voltage can have a voltage having a predetermined minimum magnitude that can be provided to the source driver 300.

For example, if ten switches are connected in parallel to form the first to the fourth switch stages (TR1<1>~ TR1<10>, TR2<1>~ TR2<10>, TR3<1>~TR3<10>, and TR4<1>~ TR4<10>), and operating only a half of the plurality of switches connected in parallel to the first to the fourth switch stages, respectively, is sufficient in outputting the voltage having the predetermined minimum magnitude that can be provided to the source driver 300 at the porch period, the charge pump control unit 610 may generate the first to the fourth control signals which control only a half of the switches (TR1<1>~ TR1<5>, TR2<1>~ TR2<5>, TR3<1>~ TR3<5>, and TR4<1>~ TR4<5>) to perform a turn-on or turn-off operation, and the remaining half (TR1<6>~ TR1<10>, TR2<6>~ TR2<10>, TR3<6>~ TR3<10>, and TR4<6>~ TR4<10>) not to operate in a turn-off state. With this configuration, it is possible to reduce the power consumption by the static current by reducing the number of the operating switches of the charge pump 620*c* at the porch period.

Figure 4:
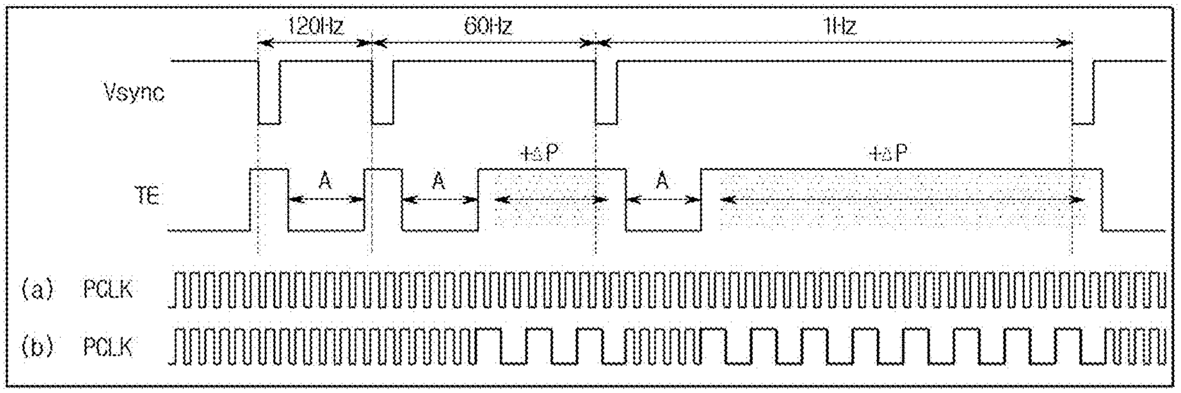
FIG. 4 is a timing diagram for describing an operation of controlling a charge pump by modulating a frequency of a pumping clock signal at a porch period according to an embodiment of the present disclosure.

FIG. 4 is a timing diagram for describing an operation of controlling the charge pump by modulating the frequency of the pumping clock signal at the porch period according to an embodiment of the present disclosure.

Referring to FIG. 4, according to an embodiment, the timing controller 200 may provide the image data DATA to the source driver 300 with a predetermined time gap, in response to the vertical synchronization signal VSYNC configured to generate vertical synchronization. Even if the frequency of the vertical synchronization signal VSYNC is changed, the timing controller 200 may provide the image data DATA to the source driver 300 at the same rate within a constant time period. For example, the transmission rate at which the image data DATA is provided to the source driver 300 may be defined as a transmission rate at which the image data is provided within a frame, in case the vertical synchronization signal VSYNC is the maximum frequency; however, the transmission rate is not limited thereto.

According to an embodiment, the timing controller 200 may set a period of a constant time period taken in providing the image data DATA to the source driver 300 as the active period A, and may set a period by a time point before responding to the vertical synchronization signal VSYNC for generating the next vertical synchronization since a time point after all the data is provided as the porch period P.

According to an embodiment, the timing controller 200 may generate the anti-tearing signal TE configured to transition into a deactivation signal level (a low level) to indicate that the image data DATA is being provided to the source driver 300 at the active period A, and to transition into an activation signal level (a high level) to indicate that the image data DATA is not provided to the source driver 300 at the porch period P.

According to an embodiment, since the timing controller 200 has to provide the image data DATA to the source driver 300 in the constant time period regardless of an increase or decrease of the frequency of the vertical synchronization signal VSYNC, the length of the active period A at which the data is provided may be constant all the time. On the other hand, since a time when the timing controller 200 responds to the next vertical synchronization signal VSYNC decreases or increases according to the frequency of the vertical synchronization signal VSYNC, a length of the porch period P may decrease or increase.

According to an embodiment, the charge pump control unit 610 may receive the anti-tearing signal TE from the timing controller 200, and based on the anti-tearing signal TE, the charge pump control unit 610 may generate the first to the fourth control signals (SW1 to SW4) by determining the active period A as the first mode and the porch period P as the second mode. The charge pump control unit 610 may control the switching operation of the charge pump 620 through the first to the fourth control signals (SW1 to SW4).

The illustration (a) is a related art, and in (a), the frequencies of the first to the fourth control signals (SW1 to SW4) are constant without the distinction of the active period A and the porch period P. Accordingly, the switching operation of the charge pump 620 is performed in a constant manner without the distinction of the active period A and the porch period P.

On the other hand, in case of the illustration (b), according to an embodiment of the present disclosure, the switching operation of the charge pump 620 may slow down at the porch period P, by generating the first to the fourth control signals (SW1 to SW4) having lower frequencies in the second mode at the porch period P than the frequencies in the first mode at the active period A. Therefore, the power consumption by the static current consumed by the charge pump 620 may be reduced in the second mode at the porch period P.

Figure 5:
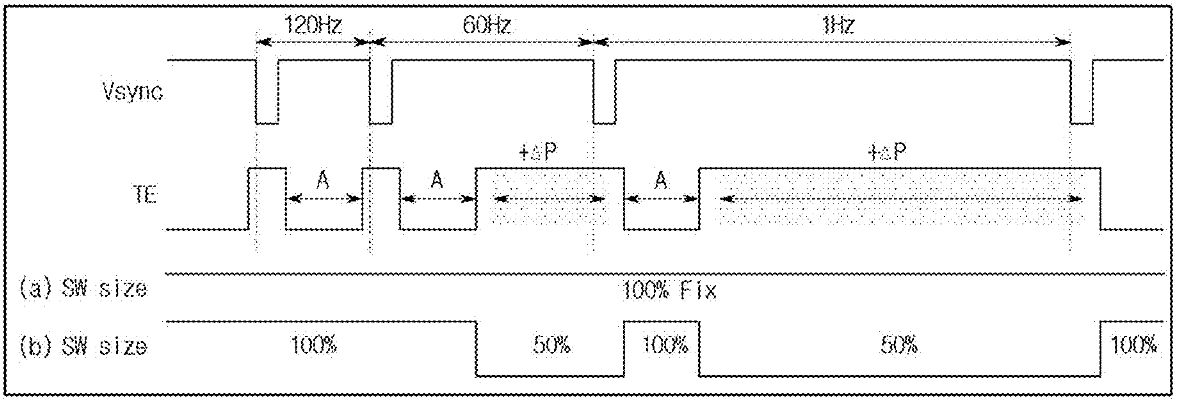
FIG. 5 is a timing diagram describing a method for allowing only some switches of a charge pump to perform a turn-on or turn-off operation by controlling a control signal at a porch period according to an embodiment of the present disclosure.

FIG. 5 is a timing diagram describing a method for allowing only some switches of the charge pump to perform a turn-on or turn-off operation by controlling the control signal at the porch period according to an embodiment of the present disclosure.

Referring to FIG. 5, as described by FIG. 4, according to an embodiment, the charge pump control unit 610 may receive the anti-tearing signal TE configured to identify the active period A and the porch period P.

In the case of illustration (a), all the plurality of switches connected in parallel to the first to the fourth switch stages, respectively, perform a turn-on or turn-off operation without the distinction of the active period A and the porch period P.

On the other hand, in the case of illustration (b), according to an embodiment of the present disclosure, in the second mode at the porch period P, the charge pump control unit 610 may control only some switches of the plurality of switches connected to the first to the fourth switch stages in parallel, respectively, to perform a turn-on or turn-off operation, and the remaining switches not to operate in the turn-off state, based on the anti-tearing signal TE. Accordingly, it is possible to reduce the power consumption by the static current consumed by the charge pump 620 by reducing the number of operating switches of the charge pump 620 by means of the second mode at the porch period P.

Figure 6:
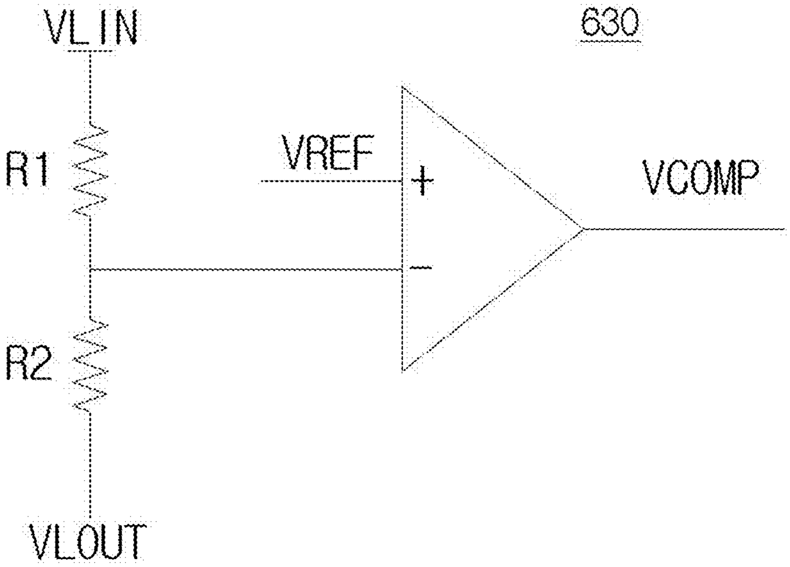
FIG. 6 is a diagram illustrating a circuit of a pump voltage comparison unit according to another embodiment of the present disclosure.

FIG. 6 is a diagram illustrating a circuit of the pump voltage comparison unit according to another embodiment of the present disclosure.

Referring to FIG. 6, according to another embodiment, the voltage source output circuit 600 may further include the pump voltage comparison unit 630.

According to another embodiment, the pump voltage comparison unit 630 may compare the pump voltage VLOUT and a predetermined detection voltage VREF. When the magnitude of the pump voltage VLOUT is smaller than the magnitude of the detection voltage VREF, the pump voltage comparison unit 630 may generate a comparison voltage VCOMP at a high level. Values of the detection voltage VREF may be set differently per the power supply voltage VLIN, the pump voltage VLOUT, and the resistances (R1 and R2).

According to another embodiment, the comparison voltage VCOMP output from the pump voltage comparison unit 630 is provided to the charge pump control unit 610, and the charge pump control unit 610 may control the operation of the charge pump 620 based on the comparison voltage VCOMP.

Figure 7:
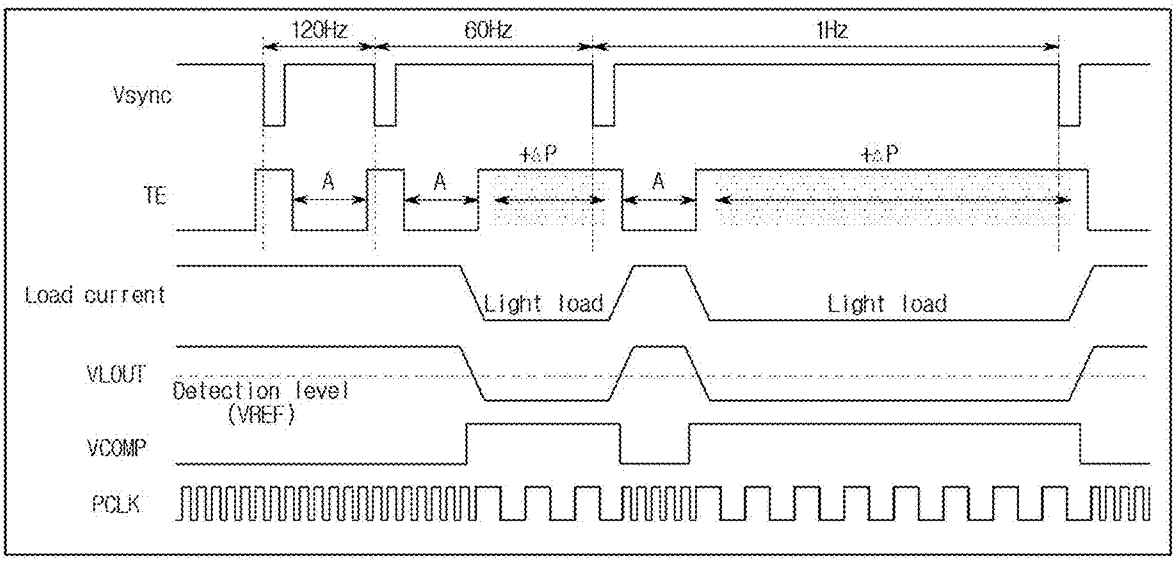
FIG. 7 is a timing diagram for describing an operation of controlling a charge pump by modulating a frequency of a pumping clock signal based on a comparison voltage according to another embodiment of the present disclosure.

FIG. 7 is a timing diagram for describing an operation of controlling the charge pump by modulating a frequency of the pumping clock signal based on the comparison voltage according to another embodiment of the present disclosure.

Referring to FIG. 7, the magnitude of the pump voltage VLOUT output ahead of or after the porch period P may decrease according to another embodiment. The decrease in the magnitude of the pump voltage VLOUT may be attributable to a decrease in a load current flowing in a load stage of the charge pump 620.

According to another embodiment, the pump voltage comparison unit 630 may compare the magnitude of the pump voltage VLOUT and the magnitude of the predetermined detection voltage VREF, and may output the comparison voltage VCOMP at a high level, when the magnitude of the pump voltage VLOUT is smaller than the magnitude of the detection voltage VREF. The pump voltage comparison unit 630 may provide the comparison voltage VCOMP to the charge pump control unit 610.

According to another embodiment, the charge pump control unit 610 may generate the first to the fourth control signals by modulating a frequency of the pumping clock signal PCLK to be low in the second mode at the period at which the comparison voltage VCOMP at a high level is output.

Description of the control of the charge pump control unit 610 in the second mode to lower the frequency of the pumping clock signal PCLK so as to control the charge pump 620 is the same as the description provided with reference to FIG. 4; therefore, the description thereof will be omitted.

Figure 8:
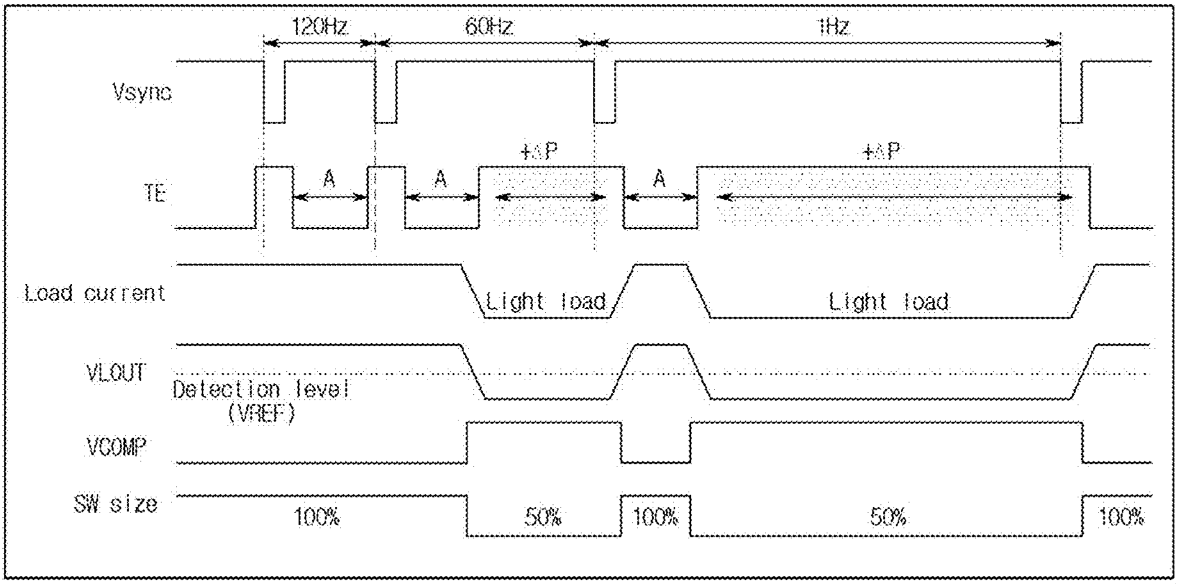
FIG. 8 is a timing diagram describing a method for operating only some switches of a charge pump to be turned on or off by controlling a pumping clock signal based on a comparison voltage according to another embodiment of the present disclosure.

FIG. 8 is a timing diagram describing a method for operating only some switches of the charge pump to be turned on or off by controlling the pumping clock signal based on the comparison voltage according to another embodiment of the present disclosure.

Referring to FIG. 8, as described by referring to FIG. 7, according to another embodiment, the pump voltage comparison unit 630 may compare the magnitude of the pump voltage VLOUT and the magnitude of the predetermined detection voltage VREF, and may output the comparison voltage VCOMP at a high level when the magnitude of the pump voltage VLOUT is smaller than the magnitude of the detection voltage VREF. The pump voltage comparison unit 630 may provide the comparison voltage VCOMP to the charge pump control unit 610.

According to another embodiment, at a period at which the comparison voltage VCOMP at a high level is output, the charge pump control unit 610 may control, in the second mode, only some switches of the plurality of switches connected to the first to the fourth switch stages in parallel, respectively, to perform a turn-on or turn-off operation, and the remaining switches not to operate in the turn-off state. Therefore, by operating only some switches of the charge pump 620 in the second mode at the period at which the comparison voltage VCOMP at a high level is output, that is, the period at which the source driver does not need the pump voltage VLOUT at a high voltage, the power consumption by the static current consumed by the charge pump 620 may be reduced.

Figure 9:
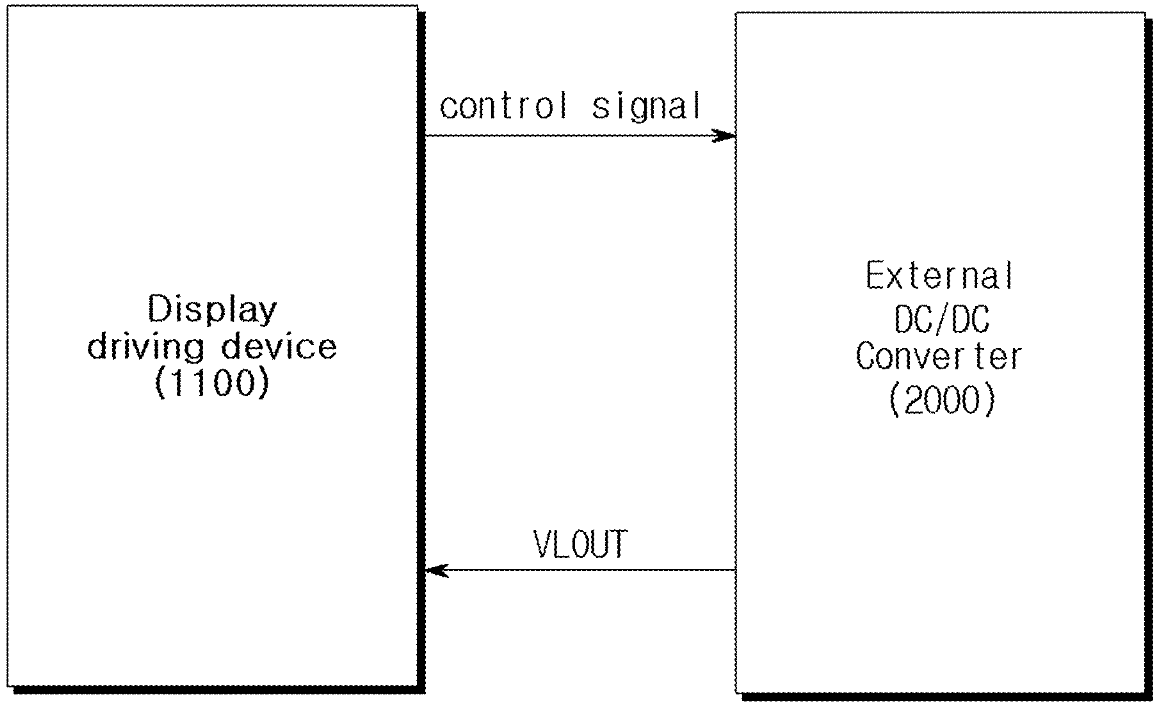
FIG. 9 is a diagram illustrating an example of providing a pump voltage by an external DC/DC converter according to another embodiment of the present disclosure.
Figure 10:
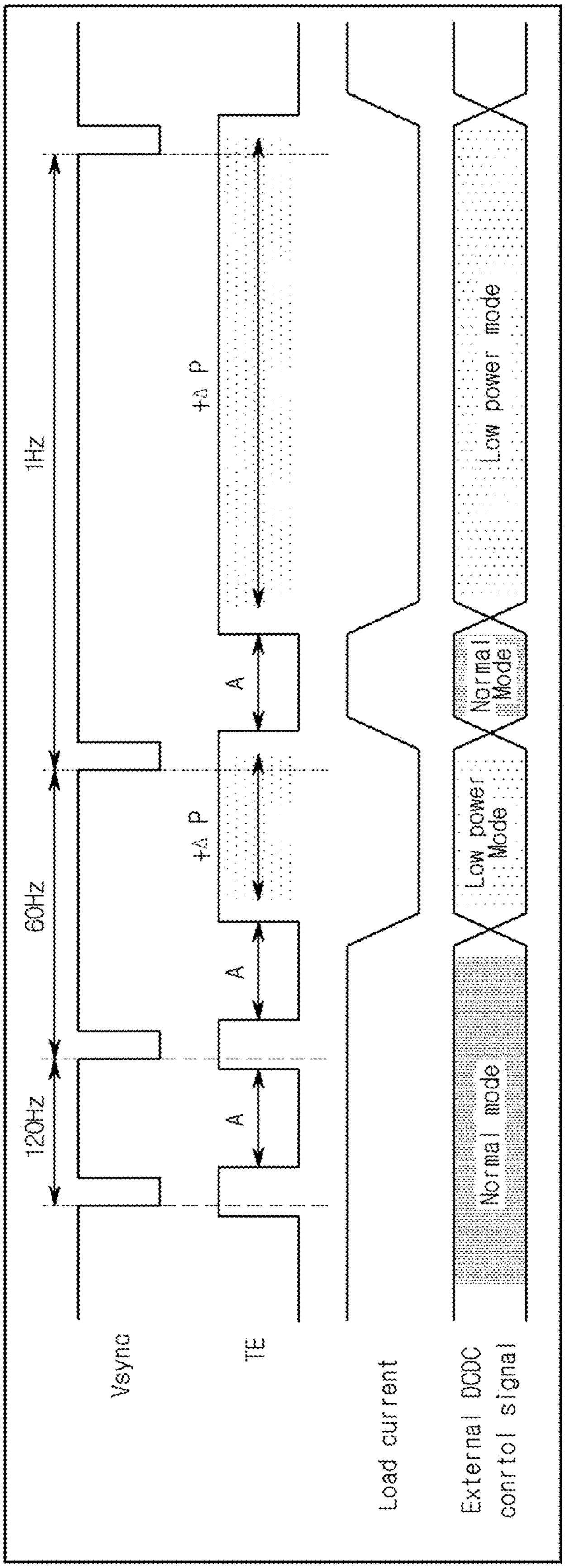
FIG. 10 is a timing diagram for operating an external DC/DC converter in a low voltage mode at a porch period, according to another embodiment of the present disclosure.

FIG. 9 is a diagram illustrating an example of providing the pump voltage by an external DC/DC converter according to another embodiment of the present disclosure. FIG. 10 is a timing diagram for operating an external DC/DC converter in a low voltage mode at the porch period.

Referring to FIGS. 9 and 10, the display driving device 1100, including the timing controller 200 and the source driver 300, may provide the control signal to an external DC/DC converter 2000. The control signal may include a clock signal and a mode selection signal, which is set by the external DC/DC converter 2000; however, the signals included are not limited thereto. The external DC/DC converter 2000 may output the pump voltage VLOUT desired for driving the display device based on the control signal of the display driving device 1100.

A conventional external DC/DC converter 2000 may have been set to output the pump voltage VLOUT regardless of the periods. However, according to an embodiment of the present disclosure, it is possible to make the external DC/DC converter 2000 operate in a normal mode only at the active period A so as to output the pump voltage VLOUT, in addition, to make the external DC/DC converter 2000 operate in a low power mode at the porch period P, thereby reducing the power consumption.

According to various embodiments of the present disclosure, the display driving device 1100 may provide the control signal to the external DC/DC converter 2000 based on the anti-tearing signal TE so that the external DC/DC converter 2000 can operate the above-described operations.

One or more embodiments of the present disclosure relate to a display driving device and a method thereof, and more particularly, to a display driving device capable of reducing power consumption by a static current by controlling a switching operation of a charge pump at a porch period, and a method thereof.

According to one or more embodiments of the present disclosure, power consumption is reduced by static current, by identifying an active period at which data is provided from a timing controller to a source driver in response to a vertical synchronization signal VSYNC, and a porch period at which the provision of data is blocked until a response to the next vertical synchronization signal, and controlling a switching operation of the charge pump, which is included to the voltage source output circuit, at the porch period.

According to one or more embodiments of the present disclosure, it is possible to reduce the power consumption by the static current by operating the switching operation of the charge pump, which is included to the voltage source output circuit, at the porch period.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A display driving device, comprising:
- a timing controller configured to generate a pumping clock signal and an anti-tearing signal identifying an active period and a porch period based on a vertical synchronization signal; and
- a charge pump configured to output a pump voltage for driving a source driver, the charge pump comprising:
  - a flying capacitor;
  - a first switch disposed between one end of the flying capacitor and a first terminal connected to a first external voltage;
  - a second switch disposed between the one end of the flying capacitor and a second terminal outputting a first output voltage;
  - a third switch disposed between another end of the flying capacitor and a third terminal connected to a second external voltage;
  - a fourth switch disposed between the another end of the flying capacitor and a fourth terminal outputting a second output voltage; and
  - a charge pump control unit configured to control turning on or off of the first to the fourth switches based on the anti-tearing signal, and control the first to the fourth switches based on the anti-tearing signal to operate in a first mode or a second mode,
  - wherein the second mode is configured to reduce power consumption than in the first mode.

2. The display driving device of claim 1,
- wherein, in the active period, the timing controller provides image data to the source driver, and
- wherein, in the porch period, the timing controller does not provide image data to the source driver.

3. The display driving device of claim 1,
- wherein the timing controller generates a deactivation signal level of the anti-tearing signal during the active period, and generates a activation signal level of the anti-tearing signal during the porch period.

4. The display driving device of claim 1,
- wherein the charge pump control unit is configured to operate in the first mode at the active period, and operate in the second mode at the porch period based on the anti-tearing signal.

5. The display driving device of claim 1,
- wherein, in the second mode, the charge pump control unit is configured to control a frequency of a pumping clock signal configured to turn on or off the first to the fourth switches.

6. The display driving device of claim 1, further comprising:
- a pump voltage comparison unit configured to compare the pump voltage and a predetermined detection voltage, and output a comparison voltage at a high level when a magnitude of the pump voltage is smaller than a magnitude of the detection voltage,
- wherein the charge pump control unit is configured to control the first to the fourth switches to operate based on the comparison voltage in the first mode or the second mode.

7. The display driving device of claim 6,
- wherein the charge pump control unit is configured to control a frequency of the pumping clock signal configured to turn on or off the first to the fourth switches in the second mode at a period at which the comparison voltage at the high level is output.

8. A display driving device, comprising:
- a timing controller configured to generate a pumping clock signal and an anti-tearing signal identifying an active period and a porch period based on a vertical synchronization signal; and
- a charge pump configured to output a pump voltage for driving a source driver, the charge pump comprising:
  - a flying capacitor;
  - a first switch stage comprising at least one switch disposed between one end of the flying capacitor and a first terminal connected to a first external voltage and connected in parallel thereto;
  - a second switch stage comprising at least one switch disposed between the one end of the flying capacitor and a second terminal outputting a first output voltage and connected in parallel thereto;
  - a third switch stage comprising at least one switch disposed between another end of the flying capacitor and a third terminal connected to a second external voltage and connected in parallel thereto;
  - a fourth switch stage comprising at least one switch disposed between the another end of the flying capacitor and a fourth terminal outputting a second output voltage and connected in parallel thereto; and
  - a charge pump control unit configured to control turning on or off of the first to the fourth switch stages based on the anti-tearing signal to operate in a first mode or a second mode,
  - wherein the second mode is configured to reduce power consumption than in the first mode.

9. The display driving device of claim 8, wherein, in the active period, the timing controller provides image data to the source driver, and wherein, in the porch period, the timing controller does not provide image data to the source driver.

10. The display driving device of claim 8, wherein the timing controller generates a deactivation signal level of the anti-tearing signal during the active period, and generates a activation signal level of the anti-tearing signal during the porch period.

11. The display driving device of claim 8, wherein the charge pump control unit is configured to operate in the first mode at the active period, and operate in the second mode at the porch period based on the anti-tearing signal.

12. The display driving device of claim 8, wherein, in the second mode, the charge pump control unit is configured to control only some switches among the switches of the first to the fourth switch stages to be turned on or off, and control remaining switches thereof not to operate in a turn-off state.

13. The display driving device of claim 8, further comprising:

a pump voltage comparison unit configured to compare the pump voltage and a predetermined detection voltage, and output a comparison voltage at a high level when a magnitude of the pump voltage is smaller than a magnitude of the detection voltage, wherein the charge pump control unit is configured to control the first to the fourth switch stages to operate based on the comparison voltage in the first mode or the second mode configured to reduce power consumption more than in the first mode.

14. The display driving device of claim 13, wherein the charge pump control unit is configured to control only some switches among the switches of the first to the fourth switch stages to be turned on or off, and to control remaining switches thereof not to operate in a turn-off state, by operating in the second mode, at a period at which the comparison voltage at the high level is output.

15. A method for operating a display driving device comprising a first switch stage, a second switch stage, a third switch stage, and a fourth switch stage, respectively comprising at least one or more switches connected in parallel thereto so as to output a pump voltage, the method comprising:

generating an anti-tearing signal identifying an active period and a porch period based on a vertical synchronization signal;

generating a first control signal controlling the first switch stage, a second control signal controlling the second switch stage, a third control signal controlling the third switch stage, and a fourth control signal controlling the fourth switch stage based on the anti-tearing signal; and controlling an operation of a charge pump based on the first control signal, the second control signal, the third control signal, and the fourth control signal, wherein the controlling of the operation of the charge pump comprises generating a control signal of a first mode or a second mode, and wherein the second mode is configured to reduce power consumption than in the first mode based on the anti-tearing signal.

16. The method of claim 15, wherein the generating of the control signal of the second mode comprises generating a control signal having a lower frequency than a frequency of a control signal of the first mode.

17. The method of claim 15, wherein the generating of the control signal of the second mode comprises:

outputting a comparison voltage at a high level when the pump voltage is smaller than a predetermined detection voltage; and generating a control signal having a lower frequency than a frequency of a control signal of the first mode based on the comparison voltage at a high level.

18. The method of claim 15, wherein the generating of the control signal of the second mode comprises:

generating a control signal configured to control only some switches among the switches of the first to the fourth switch stages to be turned on or off, and control remaining switches thereof not to operate in a turn-off state.

19. The method of claim 15, wherein the generating of the control signal of the second mode comprises:

outputting a comparison voltage at a high level when a magnitude of the pump voltage is smaller than a magnitude of a predetermined detection voltage; and generating a control signal configured to control only some switches among the switches of the first to the fourth switch stages to be turned on or off, and to control remaining switches thereof not to operate in a turn-off state based on the comparison voltage at a high level.

20. The method of claim 18, wherein the generating of the control signal of the second mode comprises:

generating a control signal having a frequency same as a frequency of the control signal of the first mode.

* * * * *